Patented Nov. 21, 1939

2,180,614

UNITED STATES PATENT OFFICE 2,180,614

METHOD FOR THE PREPARATION OF EPI-ALLO-PREGNANOL (3)-ONE (20)

Erwin Schwenk, Montclair, N. J., Bradley Whitman, New York, N. Y., and Gerhard A. Fleischer, Montclair, N. J., assignors to Schering Corporation, Bloomfield, N. J., a corporation of New Jersey No Drawing. Application May 6, 1937,
Serial No. 141,102

11 Claims. (Cl. 260—397)

Our invention relates to the production of epi-allo-pregnanol (3)-one (20) and has for its general object the provision of an improved and economical process for the manufacture of this substance.

We have found that it is possible to prepare the epi-allo-pregnanol (3)-one (20) from allo-pregnandione (3-20), the latter being easily obtained according to the directions of Butenandt and Fleischer, Ber. d. d. chem. Ges. vol. 68, page 2094.

Our experiments have shown that it is possible to carry out the reduction of allo-pregnandione in such a way that only the ketone group in position 3 is reduced, whereas the ketone group in position 20 is not attacked by the hydrogen. Furthermore, we have found that the reduction of this 3-ketone group always yields two isomeric compounds, according to whether the hydrogen is added to the ketone group in the trans or cis position to the methyl group in position 10. We have also found that it is possible, by adding small amounts of mineral acids, like hydrobromic acid, to the reduction mixture, to obtain for the most part the so-called cis form. This is important, because only the cis-form is active as a male hormone in castrated rats or in capons.

We have, furthermore, discovered that it is possible to separate the two forms, a trans and a cis-form of the allo-pregnanolone, by treating the mixture of the two compounds dissolved in alcohol with an alcoholic solution of digitonin. Only the trans-form is precipitated by the digitonin, whereas the cis-form can be isolated in the usual way. The digitonin compound, upon splitting in the usual way, yields the trans compound which can again be transformed by oxidation into pregnandione and the previous process of reduction repeated, so that practically quantitative yields of the valuable epi-form can be obtained. The reduction process can be carried out in different solvents like alcohols, ethyl acetate and other organic liquids, but acetic acid has been found to be the most suitable. As catalyst we prefer platinum black or platinum oxide, but also other catalysts like palladium or nickel can be used, which in the absence of high temperatures act mildly and effect hydrogenation substantially only of the 3-keto group.

Example 1.—10 gm. of pregnandione, melting point 200.5° C., are dissolved in 50 cc. of acetic acid. 2 cc. of 48% hydrobromic acid are added, and also 5 gm. of platinum black, and the mixture is shaken with hydrogen until one mol of hydrogen is taken up. The solution is worked up by filtering off the catalyst and adding water to the filtrate. Epi-allo-pregnanol (3)-one (20) is precipitated, which after repeated recrystallization from dilute alcohol or dilute acetone shows a melting point of 163 to 165° C. The optical rotation was found to be +90.

Example 2.—5 gm. of allo-pregnandione, melting point 200.5° C., are dissolved in 250 cc. of ethyl alcohol, and 5 cc. of concentrated hydrochloric acid and 5 gm. of platinum oxide catalyst prepared according to Adams Schriner (see Journal of the American Chemical Society, vol. 45, 2171, 1923, and Organic Synthesis, Collective Volume I, p. 452) are added, and the mixture shaken with hydrogen until the absorption is 1 mol. The reaction product is worked up as described in Example 1. The relatively crude reaction product is dissolved in alcohol, 10 gm. of digitonin dissolved in alcohol are added, and the mixture left standing for a day. Then the digitonide is filtered off and the solution worked up as usual by diluting with water, extracting with ether and washing of the ether extract with dilute acid and water. The ether solution is evaporated and the crude residue, which is about 3.5 gm., is recrystallized from dilute alcohol, whereby 3 gm. of epi-allo-pregnanolone are obtained. The digitonin compound is dissolved in pyridine and dry ether added. The precipitate consists of digitonin. From the mother liquor, about 1 gm. of the trans-form can be isolated, which by oxidation with chromic acid in acetic acid again gives allo-pregnandione, the starting material, which can be treated as above for the production of epi-allo-pregnanolone.

We claim:

1. The method of producing epi-allo-pregnanol (3)-one (20) which comprises subjecting allo-pregnandione to the action of hydrogen in the presence of a hydrogenation catalyst acting to limit the reduction substantially to the 3-keto group.

2. The method of producing epi-allo-pregnanol (3)-one (20) which comprises subjecting allo-pregnandione to the action of hydrogen in the presence of a hydrogenation catalyst acting to limit the reduction substantially to the 3-keto group, and until approximately one mol of hydrogen has been absorbed.

3. The method according to claim 1, wherein the hydrogenation takes place in the presence of a strong, non-oxidizing mineral acid.

4. The method of producing epi-allo-pregnanol (3)-one (20) which comprises subjecting allo-pregnandione to the action of hydrogen in the presence of a hydrogenation catalyst and of hydrobromic acid until approximately one mol of hydrogen has been absorbed.

5. The method of producing epi-allo-pregnanol (3)-one (20) which comprises subjecting allo-pregnandione to hydrogenation in the presence of a hydrogenation catalyst acting to limit the reduction substantially to the 3-keto group, and then separating the cis-form of the reaction product from the trans-form of the reaction product.

6. The method according to claim 5, wherein the separation of the cis and trans-forms is effected by precipitating the trans-form with digitonin.

7. The method according to claim 5, wherein the separation of the cis and trans-forms is effected by precipitating the trans-form with digitonin, and splitting the digitonin compound, and then oxidizing the trans-form of the pregnanolone to allo-pregnandione.

8. The method according to claim 1, wherein the reduction is effected in the presence of a platinum catalyst.

9. The method according to claim 5, wherein the trans-form of the reaction product is oxidized to allo-pregnandione, and the latter then hydrogenated as aforesaid.

10. The method of producing epi-allo-pregnanol (3)-one (20) which comprises subjecting allo-pregnandione to the action of hydrogen in the presence of a hydrogenation catalyst until approximately one mol of hydrogen has been absorbed.

11. The method according to claim 10, wherein the catalyst contains a member of the group consisting of platinum and palladium.

ERWIN SCHWENK.
BRADLEY WHITMAN.
GERHARD A. FLEISCHER.